United States Patent
Chaney et al.

[11] 3,738,755
[45] June 12, 1973

[54] ANALYZER EMPLOYING MAGNETO-OPTIC ROTATION

[75] Inventors: Robert L. Chaney, Cupertino; Michael A. Kelly, Mountain View, both of Calif.

[73] Assignee: Hewlett-Packard Company, Palo Alto, Calif.

[22] Filed: July 14, 1971

[21] Appl. No.: 162,602

[52] U.S. Cl................. 356/117, 250/225, 350/149
[51] Int. Cl. ............................................. G01n 21/40
[58] Field of Search........................... 356/114, 117; 250/225

[56] References Cited
UNITED STATES PATENTS
3,442,592   5/1969   Grosjean........................ 356/114 X
3,450,477   6/1969   Meltzer............................... 356/114

Primary Examiner—John K. Corbin
Attorney—Roland I. Griffin

[57] ABSTRACT

A magneto-optic rotation analyzer method and apparatus is disclosed. In the analyzer, a light beam of linearly polarized light, preferably in the ultra-violet region is shown through a sample of a material to be analyzed. A magnetic field is applied to the sample parallel to the light beam to obtain magneto-optic rotation of the polarization of the light by constituents of the sample. The emerging light beam is analyzed as to its polarization to separate light which is rotated from light which has not been rotated. One of the separated light beams is detected by a photodetector. The magneto-optic rotation effect is modulated at a certain modulation frequency and the output signal is synchronously detected against the modulation frequency or a harmonic thereof for improved signal-to-noise ratio. The synchronously detected output is measured to obtain a measurement of the sample under analysis.

9 Claims, 7 Drawing Figures

INVENTORS
ROBERT L. CHANEY
MICHAEL A. KELLY

BY Roland I. Griffin

ATTORNEY

INVENTORS
ROBERT L. CHANEY
MICHAEL A. KELLY

BY Roland D. Griffin
ATTORNEY

3,738,755

ANALYZER EMPLOYING MAGNETO-OPTIC ROTATION

BACKGROUND OF THE INVENTION

Heretofore, magneto-optic rotation monochromator or light filter experiments have been disclosed wherein the magnetic field within a known sample has been modulated. The polarization analyzed output beam from the sample was fed through an extremely narrow optical band resonance cell filter and thence to a photodetector. Such a magneto-optic monochromator is disclosed in an article titled "Modulation and Filtration of Resonance Radiation With The Use Of The Faraday Effect" appearing in Optics and Spectroscopy, Volume 19, No. 3, pages 254–255, of September 1965. While this monochromator of the prior art is useful for examining qualitative line splittings by magneto-optic rotation near the edges of a relatively narrow intense known spectral line, it is not used as an analyzer for determining quantitative information concerning the amount of trace quantities of unknown molecular or atomic constituents of fluid samples, such as gas or liquid samples, particularly where the signal-to-noise ratio is orders of magnitude below the signal-to-noise ratio in the aforementioned prior art experiment.

In another prior art monochromator experiment the magneto-optic activity near the band edges of known strong absorption lines of a known gas has been qualitatively and quantitatively investigated. The band edge line splittings due to Zeeman splitting and transitions between rotational and vibrational states of the molecule or atom have been studied and related to the molecular or atomic structure. In such an experimental apparatus it was speculated that more easily interpretable results could be obtained by modulating the applied longitudinal magnetic field and employing phase-sensitive detection. See an article titled "Magnetic Optical Activity," appearing in the Annual Review of Physical Chemistry, Vol. 17, (1966), pp. 399–432 at p. 427. However, this work does not contemplate a liquid or gas analysis system for obtaining quantitative information about the amount of trace quantities of a gas in a sample under analysis.

SUMMARY OF THE INVENTION

The principal object of the present invention is the provision of an improved analyzer employing magneto-optic rotation.

One feature of the present invention is the provision, in a magneto-optic rotation analyzer of modulating the magneto-optic rotation in the probing light beam caused by the sample at a modulation frequency to produce a corresponding modulation in the composite detected magneto-optic rotation electrical signal, and synchronously detecting the composite electrical signal against a reference frequency derived from the modulation frequency for separating the magneto-optic rotation component due to the presence of the sample from the remainder of the composite detected electrical signal, whereby a measurement of the synchronously detected output yields a measure of the quantity of a magneto-optically active material within the sample.

Another feature of the present invention is the same as the preceding feature wherein the magneto-optic rotation effect caused by the sample is modulated by modulating the intensity of the magnetic field applied to the sample.

Another feature of the present invention is the same as the first feature wherein the magneto-optic rotation effect is modulated by modulating the frequency of the probing light beam.

Another feature of the present invention is the same as any one or more of the preceding features including the provision of an optical filter disposed between the source of the probing light and the optical detector for limiting the passband of the optical light passing to the optical detector to a band encompassing substantially only the magneto-optic rotation spectrum of a constituent of the sample to be detected.

Another feature of the present invention is the same as the preceding feature wherein the optical passband of the probing light passed by the filter to the optical detector is changed from one band to another for detecting different constituents within the sample.

Another feature of the present invention is the provision, in a magneto-optic rotation molecular analyzer, of directing a probing light beam through the sample under analysis, such light beam having a bandwidth of optical frequencies in excess of the bandwidth of the magneto-optic rotation spectrum of a constituent of the sample to be detected, scanning the frequency of the light passed to the photodetector to repetitively scan through the magneto-optic rotation spectrum of the constituent of the sample to produce modulation of the light detected by the optical detector at a frequency related to the scanning frequency, and detecting the output electrical signal of the optical detector against a reference frequency related to the scan frequency to separate the magneto-optic rotation signal from the composite detected electrical signal.

Another feature of the present invention is the same as any one or more of the preceding features wherein the composite electrical signal is detected against the reference frequency by counting the signal "up" during one portion of the reference cycle and counting the signal "down" during another portion of the reference cycle.

Other features and advantages of the present invention will become apparent upon perusal of the following specification taken in connection with the accompanying drawings wherein:

DESCRIPTION OF THE PREFERRED EMBODIMENTS

Figure 1:
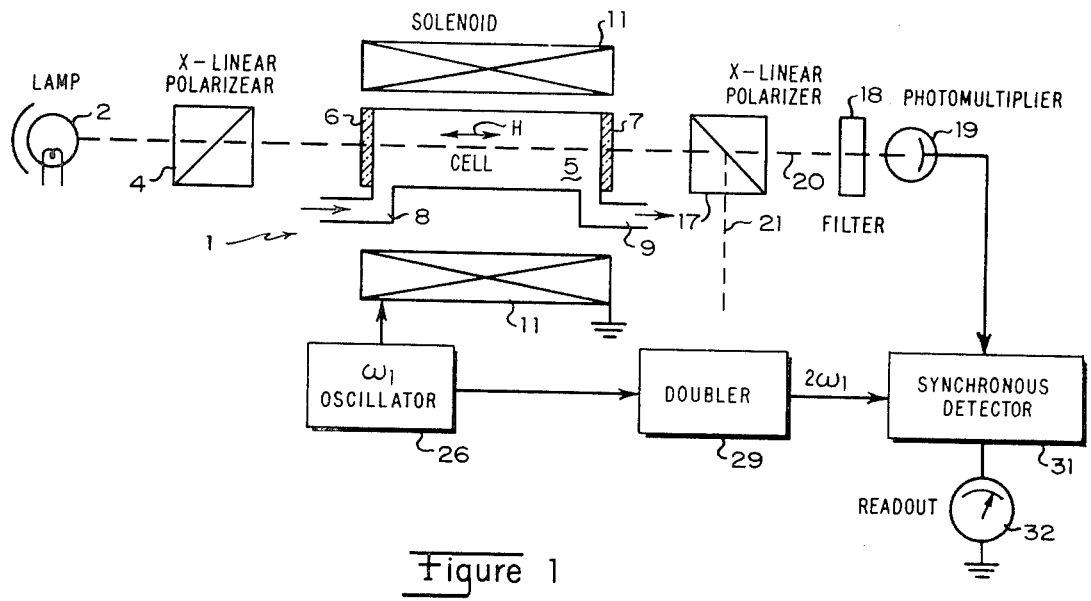
FIG. 1 is a schematic line diagram, partly in block diagram form depicting a magneto-optic rotation analyzer incorporating features of the present invention.
Figure 2:
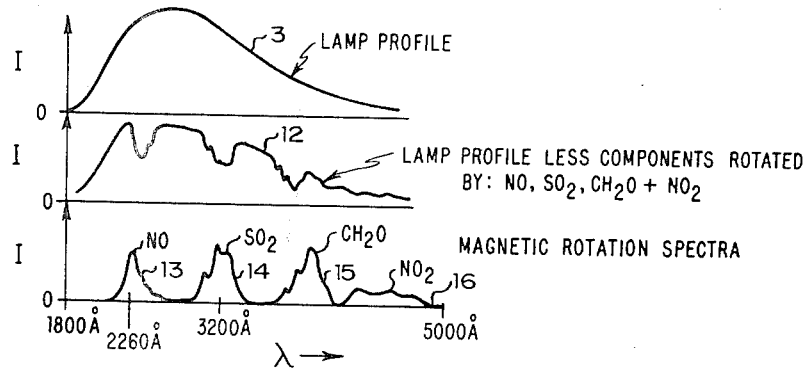
FIG. 2 is a plot of detected optical intensity I versus optical wavelength for three quantities, namely, lamp profile, lamp profile less absorption by certain gases, and for the magnetic rotation spectrum of the various constituents of the gas sample.

Referring now to FIG. 1, there is shown the magneto-optic rotation molecular analyzer 1, incorporating features of the present invention. The analyzer includes a light source or lamp 2, such as a deuterium lamp producing ultra-violet radiation having a spectral profile of intensity versus wavelength as shown by curve 3 of FIG. 2. The light from the lamp 2 is directed through a linear polarizer 4, such as a calcite or quartz Glan-Taylor prism, into a sample cell 5, such as a stainless steel bobbin, of 0.5 inch inside diameter and 4.0 inches long, having quartz windows 6 and 7 closing off opposite ends of the cell. Fluid to be analyzed, such as a gas or liquid, is fed through the cell via input line 8 and output line 9. A magnetic solenoid 11 is wound on the bobbin for producing a relatively strong axial magnetic field H having a strong component directed parallel to the path of the light beam passing through the sample cell 5.

The action of the magnetic field H on the molecules within the sample fluid being analyzed is to rotate the polarization of the light such that a small fraction of the light is rotated 90° relative to the linear polarization of the light beam incident on the sample. The light which is rotated by the sample constituents is found to have occurred at different wavelengths across the spectral profile of the lamp. For example, in FIG. 2, curve 12 depicts the lamp profile less those components of the light beam which are rotated by 90° due to passing through the sample constituents consisting of NO, $SO_2$, $CH_2O$ and $NO_2$. The spectral profiles for the various components of light which have been rotated by 90° are indicated by curves 13, 14, 15, and 16 of FIG. 2.

The light beam containing the rotated components is passed through a second linear polarizer 17 with the direction of polarization oriented 90° relative to the orientation of the input linear polarizer 4. The second linear polarizer 17, which is essentially identical to the first linear polarizer 4, serves to separate the light components 20 which have been rotated by 90° relative to those components 21 which have not been rotated. Thus, the output of linear polarizer 17 consists of a first beam 20 which is passed through a filter 18 to a photomultiplier 19. Beam 20 consists of the rotated components similar to those indicated by curves 13–16 of FIG. 2. On the other hand, the second linear polarizer 17 directs the remaining lamp profile light as indicated by curve 12 of FIG. 2, into the second beam 21. Either one of the output beams 20 or 21 may be directed to the photomultiplier 19 by shifting by 90° the orientation of the output linear polarizer 17. Each light beam 20 and 21 contains essentially the same information, however, beam 20 has improved signal-to-noise ratio.

The filter 18 between the analyzer 17 and the photomultiplier 19 is preferably selected to have an optical passband covering essentially only the magneto-rotation spectrum of the sample constituent to be detected. For example, if it were desired to detect NO constituents in air, filter 18 would have an optical passband approximately 30 angstroms wide centered at 2,260 angstroms. If it were desired to detect $SO_2$, filter 18 would have a passband of 200 angstroms centered at 3,200 angstroms. If it were desired to detect $NO_2$, filter 18 would have a passband of approximately 1,000 angstroms centered at 5,000 angstroms.

Figure 3:
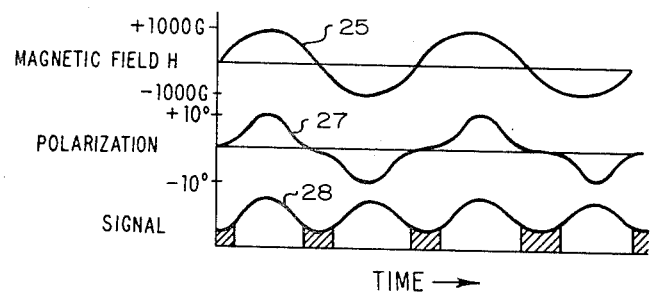
FIG. 3 is a plot of the waveforms versus time for the applied magnetic field, the magneto-optic polarization rotation, and the output of the photomultiplier detector for the analyzer of FIG. 1.

The magnetic field H is preferably an alternating magnetic field at a suitable audio frequency, such as 270 Hertz, as indicated by waveform 25 of FIG. 3. The alternating magnetic field H has a peak-to-peak amplitude of 2 kilogauss alternating between plus and minus 1,000 kilogauss and a sinusoidal waveform of frequency $\omega_1$ supplied by a power oscillator 26 which feeds energizing current to solenoid 11. On each half cycle of the applied magnetic field H, the magneto-optic rotation of the polarization of the light passing through the cell, as operated on by the sample constituents, has a peak amplitude as shown by curve 27 of FIG. 3. Although the peak rotation of the polarization is shown as plus and minus 10° a certain fraction of the light that is shifted in polarization will be shifted by 90° and the waveform for the 90° shift will be similar to that of waveform 27.

The output linear polarizer 17 converts waveform 27 into waveform 28 with one peak for each half cycle of the applied alternating magnetic field. As a result, each of the magneto-optic rotation spectrums for each of the sample components is pulsed on for each half cycle of the applied alternating magnetic field. The spectrum which is passed through the filter 18 and which is pulsating at twice the frequency of the applied magnetic field $2\omega_1$ produces a time-varying signal of frequency $2\omega_1$ in the photomultiplier 19 having a waveform as shown by curve 28 of FIG. 3. Thus, it is seen that the composite output electrical signal from photomultiplier 19 includes a component $2\omega_1$, at twice the mdoulation frequency $\omega_1$ and this component corresponds to the signal derived from the selected magneto-optic rotation spectrum within the sample under analysis.

The magneto-optic rotation signal component is separated from the composite signal 28 by synchronous detection correlation against a reference signal of the same frequency $2\omega_1$ as the signal component within the output of the photomultiplier 19. In the example given, the output of the $\omega_1$ oscillator is sampled and fed to a doubler 29 wherein it is doubled to provide a $2\omega_1$ reference fed to one input of a synchronous detector 31 for synchronous detection of the output signal 28 to separate the desired magneto-optic rotation spectrum signal from the composite signal. The output of the synchronous detector is fed to a suitable readout 32, such as an integrator and meter, indicated at 32 to obtain a measure of the quantity of the selected sample constituent, such as NO, $SO_2$, $CH_2O$, or $NO_2$. Synchronous detector 31 may take several forms, such as a phase sensitive detector, a synchronous switch or the like.

Figure 4:
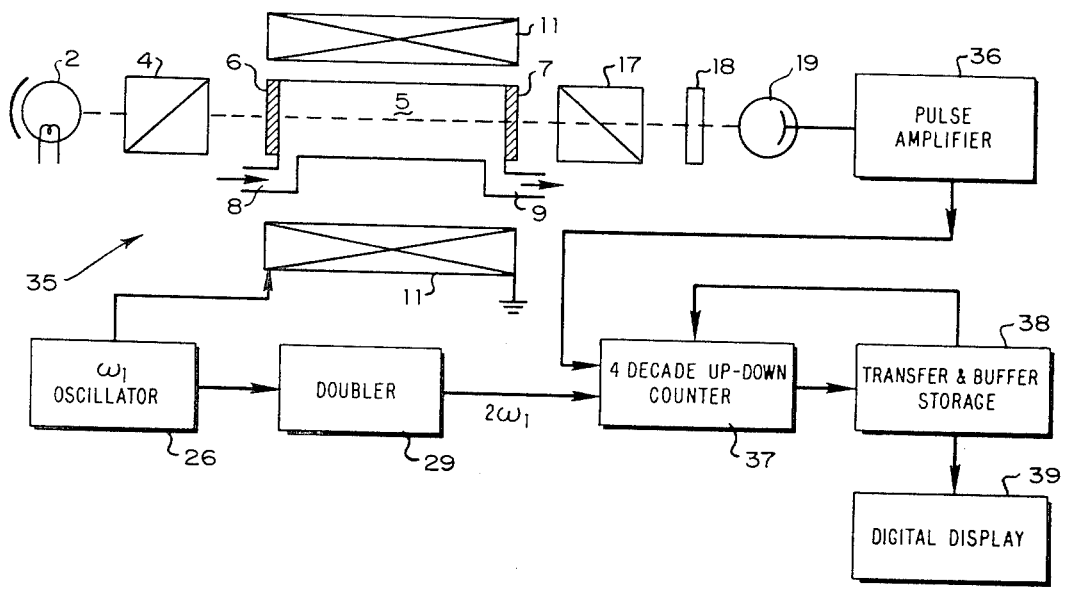
FIG. 4 is a schematic block diagram for a magneto-optic rotation analyzer similar to that of FIG. 1 and employing alternative features of the present invention.

Referring now to FIG. 4, there is shown an alternative molecular analyzer 35 substantially the same as that previously described with regard to FIG. 1 with the exception that a pulse amplifier 36 and an up and down counter 37 have been substituted for the synchronous detector 31. Pulses corresponding to the arrival of individual photons are thus detected so the analyzer of FIG. 4 is specially useful for detecting extremely low concentrations of constituents of the sample under analysis. For example, the system of FIG. 4 is useful over the range of concentration from $10^{-3}$ to $10^{-7}$ of the constituent in the sample. In the relatively low concentration ranges ≅ $10^{-7}$, a relatively large background of noise pulses are produced in the output of the photomultiplier 19 and the signal which it is desired to detect can be much smaller than the noise. For example, approximately $10^4$ spurious pulses per second are produced in the output of the photomultiplier 19, whereas the signal may produce only approximately 100 pulses per second. Thus, it is seen that the signal is about two orders of magnitude lower in intensity than the noise out of which it must be detected.

The output of the photomultiplier 19 comprises a series of pulses with pulse widths of approximately 40 nanoseconds each and with a repetition rate varying from the low end of the range to the high end of the range from $10^4$ to 100 megahertz. The pulses from the output of the photomultiplier 19 are fed to a pulse amplifier 36 wherein they are amplified. The pulse amplifier 36 preferably has a relatively wide band for amplifying the relatively short pulses, and, in addition, has a log type gain characteristic such that low intensity pulses are amplified considerably more than high intensity pulses. In this manner, the output pulses are relatively constant amplitude for counting in the up-down four decade counter 37.

At the low end of the detection range of the analyzer 35, the output of the pulse amplifier 36 consists of a background of approximately $10^4$ pulses per second. Superimposed upon this $10^4$ pulses per second is a time variation of 100 pulses per second produced by the sample. The time varying increase in the pulse rate occurs twice per cycle of the alternating magnetic field of frequency $\omega_1$. Thus, the output of the doubler 29, which consists of the $2\omega_1$ reference, is fed to one input of the up-down counter 37 such that the counter counts in one direction, such as up, when the signal is present and counts down the remaining half cycle of the $2\omega_1$ reference when the signal is absent. In this manner, the noise is automatically substracted from the composite signal to separate the desired magneto-optic rotation signal from the noise. As the count continues, the signal is automatically integrated. After a predetermined duration of the count, the output of the counter 37 is fed to a transfer and buffer storage 38 and displayed on a digital display 39 to yield a measure of the concentration of the selected constituent in the sample.

Upon receipt of the integrated count from the counter, the transfer and buffer storage 38 feeds a signal back to the up-down counter 37 to start a new count cycle. The duration of the count is determined by a timer in the transfer buffer storage 38 and the count time is set by the operator and will depend upon the signal level. The count time is selected to generally count a certain predetermined number of pulses at a predetermined expected pulse rate depending upon the expected concentration of the sample constituent and may vary from 0.01 second to minutes.

Figure 5:
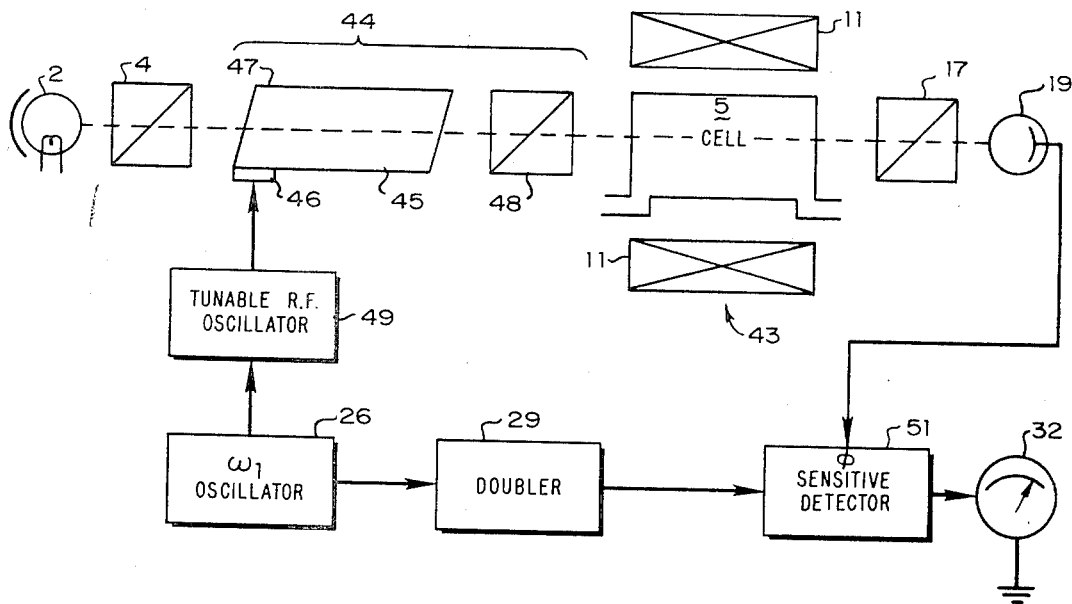
FIG. 5 is a schematic block diagram for a magneto-optic rotation analyzer employing alternative features of the present invention.

Referring now to FIG. 5, there is shown a magneto-optic rotation molecular analyzer 43 incorporating alternative features of the present invention. Analyzer 43 is similar to that described with regard to FIG. 1 with the exception that the optical filter 18 is replaced by an RF tunable acousto-optic filter 44 disclosed in an article titled "Acousto-Optical Tunable Filter" appearing in the Journal of the Optical Society of America, Vol. 59, No. 6 of June, 1969, pages 744-747, and in an article titled "Electronically Tunable Acousto-Optic Filter" appearing in the Applied Physics Letters, Vol. 15, No. 10 of Nov. 15, 1969, pages 325 and 326.

The acousto-optic filter 44 is electronically tunable over a relatively wide band and has an instantaneous passband which can be designed to have a passband width from a fraction of an angstrom to a few hundred angstroms. The acousto-optic filter 44 includes a optically birefringent crystal 45, as of lithium niobate. An acoustic transducer 46 is coupled to the crystal 45 near the upbeam end thereof for producing an acoustic wave in the cyrstal which is reflected from the input face 47 along the axis of the crystal 45 collinear with the light beam passed therethrough for cumulative collinear diffraction for diffracting light within the passband of the filter 44 from a first polarization, as produced by polarizer 4, into an output beam of orthogonal polarization. An output polarization analyzer 49, such as a Glan-Taylor prism, analyzes the output beam of the filter to separate the crossed polarized light from the light of the input polarization. The crossed polarized light, within the passband of the filter, is fed into the sample cell 5. Light components, within the light beam fed into the sample cell 5, which are within the spectral bandwidths of the sample constituents are magneto-optically rotated and the output polarization analyzer 17 separates those light components which have been rotated from those components hwich have not been rotated and feeds the rotated components to the photo-multiplier detector 19.

In one mode of operation, a tunable RF oscillator 49, which generates the electrical excitation for the transducer 46, is tuned to a frequency such that the passband of the optical filter 44 is centered on the magneto-optic rotation spectrum for the sample constituent to be observed. The passband frequencies of the optical filter 44 are then repetitively scanned back and forth across the spectrum of the sample component to be detected at the scan frequency $\omega_1$, as determined by the output of the $\omega_1$ oscillator 26 fed to the tuning control input of the oscillator 49. This produces a $2\omega_1$ signal component in the composite electrical signal in the output of the photomultiplier 19 which is fed to one input of a phase sensitive detector 51 for detection against a $2\omega_1$ reference signal derived from the output of the doubler 29 to separate the magneto-optic rotation signal from the noise. The output signal is a DC output in the output of the phase sensitive detector 51. The DC signal output is fed to the meter 32 and read out for giving a measure of the sample constituent to be observed within the sampel under analysis.

Figure 6:
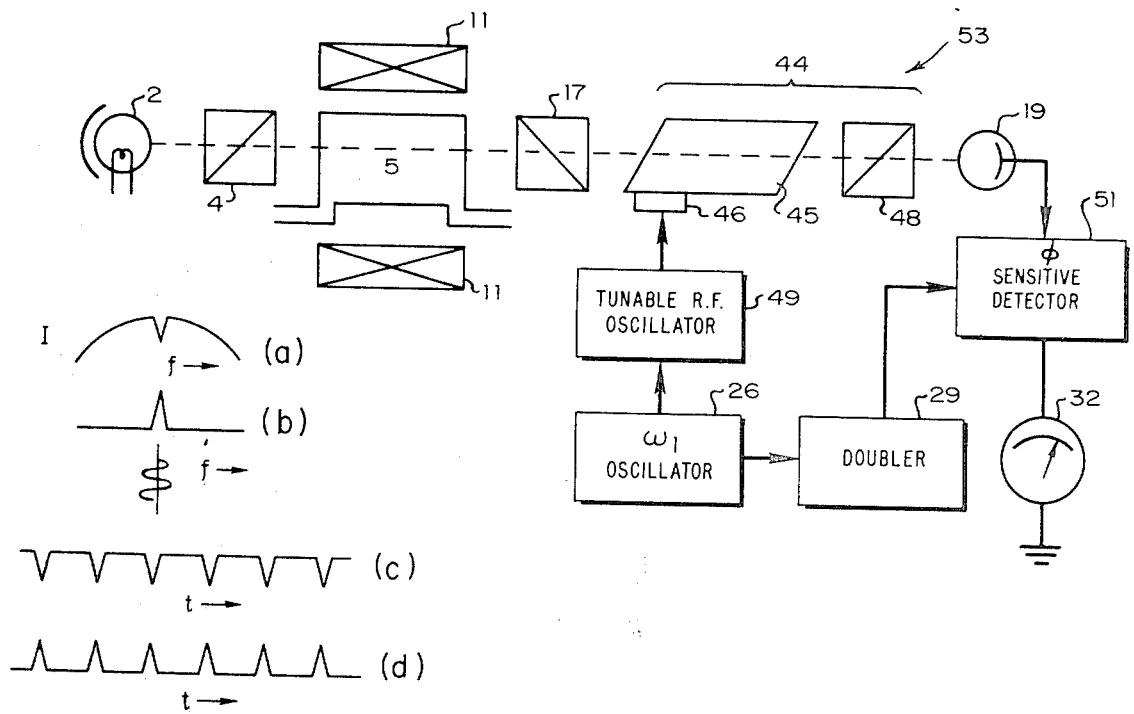
FIG. 6 is a schematic line diagram, partly in block diagram form, depicting a magneto-optic rotation analy

Referring now to FIG. 6, there is shown another magneto-optic rotation analyzer 53 incorporating features of the present invention. The analyzer 53 is similar to analyzer 43 of FIG. 5 with the exception that the acousto-optic tunable filter 44 is positioned between the output polarization analyzer 17 and the photomultiplier detector 19. The output analyzer 17 may have its polarization set the same as the input polarizer 4 for detecting the lamp profile signal less the rotated components, as indicated by waveform (a), or it may be cross polarized to the input polarizer 4 for detecting the magneto-optic rotation spectrum, as indicated by waveform (b). The passband of the acousto-optic filter 44 is then set to the center of the magneto-optic rotation spectrum of the sample constituent to be analyzed and the passband of the acousto-optic filter 44 is repetitively scanned, at a frequency $\omega_1$, over the spectrum of the sample constituent to be detected to produce an output signal at twice the modulation frequency $2\omega_1$ in the composite electrical signal output of the photomultiplier 19, as shown by waveform (c) or (d). The composite signal is then phase sensitive detected against a reference signal $2\omega_1$ derived from the output of the doubler 29 to produce the output signal which is integrated and measured by meter 32 to give a measure of the quantity of the constituent of the sample under analysis.

In the various spectrometer embodiments of FIGS. 1, 4, 5, and 6 either the magneto-optic rotation produced by the sample component to be detected is modulated or the magneto-optic rotation spectrum of the component to be detected is repetitively scanned in such a manner as to produce two output pulses for each scan cycle. Therefore, the aforedescribed synchronous detection schemes employed a doubler 29 for doubling the modulation frequency to derive the reference signal employed in the synchronous phase sensitive detector.

Figure 7:
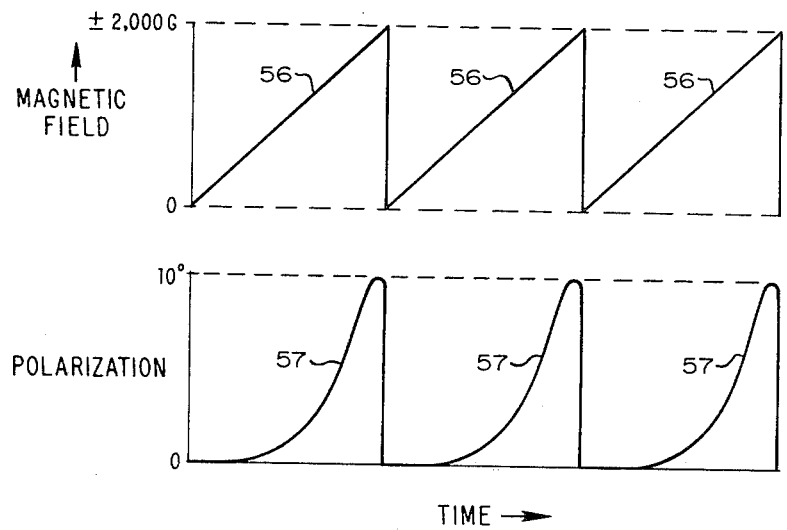
- FIG. 7 is a plot of waveforms for magnetic field and polarization rotation as a function of time and depicting an alternative method of modulation employed in the analyzers of FIGS. 1, 4 and 5.

In an alternative embodiment, either the magneto-optic rotation effect or the magneto-optic rotation spectrum is scanned in such a manner as to produce only one magneto-optic rotation output pulse per cycle of the modulation, therefore the requirement for the doubler can be eliminated in the various synchronous detection schemes disclosed in the spectro-meters of FIGS. 1, 4, 5, and 6. More specficaly, in the embodiments of FIGS. 1 and 4, the magnetic field may be swept by a saw-tooth waveform such that only one shift in the polarization is obtained per cycle of the modulation, as indicated by waveforms 56 and 57 of FIG. 7. Likewise, in the molecular analyzers 43 and 53 of FIGS. 5 and 6, the passband of the acousto-optic filter 44 can be set to one side of the magneto-optic rotation spectrum to be observed. Then either a sinusoidal or saw-tooth modulation is applied to the scan to produce a magneto-optic rotation signal having a strong component at the modulation frequency $\omega_1$ derived from the $\omega_1$ oscillator 26 or the $\omega_1$ scan generator. In addition, the up-down counter type of synchronous detection of FIG. 4 may be employed in the spectrometers of FIGS. 5 and 6.

Although, as thus far described, the magneto-optic analyzers of the present invention have been described for analyzing for moleuclar constituents, the method and apparatus of the present invention is also used to advantage for detecting atomic constituents such as Hg, Cd, Na, K, etc.

Since may changes could be made in the above construction and many apparently widely different embodiments of the invention could be made without departing from the scope thereof, it is intended that all matter contained in the above description or shown in the accompanying drawings shall be interpreted as illustrative and not in a limiting sense.

We claim:

1. In a method for analyzing a sample by detection of magneto-optic rotation the steps of, disposing a sample of matter to be anaylzed to receive a probing light beam having light of a first polarization, applying a magnetic field to the sample with a substantial component of the applied magnetic field being directed along the direction of the path of propagation of the probing light beam within the sample to produce magneto-optic rotation of the polarization of the light by the sample from the first polarization to a second polarization, said magnetic field comprising an alternating magnetic field, whereby said alternating magnetic field produces modulation of the magneto-optic rotation at a frequency which is a multiple of the frequency of the applied alternating field, and including the step of, generating a reference signal at a frequency which is a multiple of the frequency of the applied alternating magnetic field, analyzing the polarization of the light emerging from the sample, as affected by sample, to separate the emerging probing light of the first polarization, detecting the separated light of one of said polarizations to obtain a composite electrical output signal having a time varying magneto-optic electrical signal component of a frequency which is a multiple of the frequency of the applied alternating field and of an amplitude which is responsive to the quantity of material within the sample which is magneto-optically active within a band of optical frequencies of the probing light incident on the detector, corelating the composite electrical signal against said reference signal to obtain an output proportional to the time varying magneto-optic rotation electrical signal component and separated from the remainder of the composite electrical singal, and measuring the amplitude of the separated output signal to obtain a measure of the quantity of material within the sample which is magneto-optically active within the band of optical frequencies of light detected by the detector.

2. The method of claim 1 wherein the probing light incident on the sample has a first optical bandwidth broader than the magneto-optic rotation band of a component to be detected in the sample, and including the step of, filtering the probing light emerging from the sample at a point between the sample and the optical detector for passing to the optical detector only light within an optical passband less than the bandpass of the incident probing light and encompassing substantially only the magneto-optic rotation spectrum of the sample constituent to be detected.

3. The method of claim 2 including the step of, changing the optical passband frequencies of the light passed by the filter to the optical detector for detecting magneto-optic rotation of different components of the sample.

4. In an apparatus for analyzing a sample by detection of magneto-optic rotation, means for probing a sample of matter to be analyzed with a light beam having light of a first polarization, means for applying a magnetic field to the sample with a substantial component of applied magnetic field being directed along the direction of the path of propagation of the probing light beam within the sample to produce magneto-optic rotation of the polarization of the light by the sample from the direction of the first polarization to the direction of a second polarization, said magnetic field comprising an alternating magnetic field, whereby the alternating magnetic field produces a modulation of the magneto-optic rotation at a frequency which is a multiple of the frequency of the applied alternating magnetic field, means for generating a reference signal at a frequency which is a multiple of the frequency of the applied alternating magnetic field, means for analyzing the polarization of the light emerging from the sample as affected by the sample to separate the emerging light of tje first polarization from the emerging light of the second polarizaiton, means for detecting the separated light of one of said polarizations to obtain a composite electrical signal having a time varying magneto-optic rotation electrical component of a frequency which is a function of the frequency of the modulation of the magneto-optic rotation and of an amplitude which is responsive to the quantity of material within the sample which is magneto-optically active within the band of optical frequencies of light incident of said detector, means for correlating the composite electrical signal against said reference signal to obtain an output proportional to the time varying magneto-optic rotation electrical component separated from the remainder of the composite electrical signal, and means for measuring the amplitude of the output to obtain a measure of the quantity of material within the sample which is magneto-optically active within the band of optical frequencies of the light detected by the said detector.

5. The apparatus of claim 4 wherein the probing light beam has a first optical bandwidth broader than the magneto-optic rotation band of a component to be detected in the sample, and including means for filtering the light emerging from the sample at a point between the sample and said light detector means for passing to said light detector means, only light within an optical passband narrower than the bandwidth of the incident probing light and encompassing substantially only the magneto-optic rotation spectrum of the sample constitutent to be detected.

6. The apparatus of claim 5 including means for changing the optical passband of frequencies of the light passed by said filter to said light detector for detecting magneto-optic rotation of different components within the sample.

7. The apparatus of claim 4 wherein said means for detecting the composite electrical signal against said reference signal includes synchronous detector means for synchronously detecting the composite signal against the reference.

8. The apparatus of claim 4 wherein said means for detecting the composite electrical signal against said reference signal comprises a phase sensitive detector means.

9. The apparatus of claim 4 wherein said means for detecting the composite electrical signal against said reference signal comprises, counter means for counting in one direction during certain time periods of the reference quantity and for counting in the opposite direction during remaining periods of the reference quantity and means for subtracting counts in one direction from the counts in the other direction to derive a difference count, said difference count corresponding to an integration of the time varying electrical magneto-optic rotation signal component which is separated from the remainder of the composite electrical signal.

* * * * *